United States Patent [19]
Shah et al.

[11] Patent Number: 5,646,936
[45] Date of Patent: Jul. 8, 1997

[54] KNOWLEDGE BASED PATH SET UP AND SPARE CAPACITY ASSIGNMENT FOR DISTRIBUTED NETWORK RESTORATION

[75] Inventors: Jasvantrai C. Shah, Richardson; Sridhar S. Nathan, Plano, both of Tex.

[73] Assignee: MCI Corporation, Washington, D.C.

[21] Appl. No.: 493,747

[22] Filed: Jun. 22, 1995

[51] Int. Cl.$^6$ ..................................................... H04J 3/14
[52] U.S. Cl. .................... 370/228; 379/221; 340/827
[58] Field of Search .................... 370/13, 14, 16, 370/54, 58.1, 58.3, 85.7, 95.1; 371/20.1; 379/219, 220, 221; 395/181, 182.01, 182.02; 340/825.01, 827

[56] References Cited

U.S. PATENT DOCUMENTS

| | | | |
|---|---|---|---|
| 4,956,835 | 9/1990 | Grover | 370/16 |
| 4,999,829 | 3/1991 | Fite, Jr. et al. | 370/16 |
| 5,218,601 | 6/1993 | Chujo et al. | 370/16 |
| 5,235,599 | 8/1993 | Nishimura et al. | 371/20.1 |
| 5,459,716 | 10/1995 | Fahim et al. | 370/16 |
| 5,495,471 | 2/1996 | Chow et al. | 370/16 |
| 5,513,345 | 4/1996 | Sato et al. | 395/182.02 |
| 5,537,532 | 7/1996 | Chng et al. | 395/182.02 |

Primary Examiner—Benedict V. Safourek
Assistant Examiner—Ricky Q. Ngo

[57] ABSTRACT

In a telecommunications network having a plurality of intelligent nodes interconnected by multiple communication channels, alternate paths and spare channels are set up for restoring traffic disrupted by failure to one or more of the communications channels. The alternate paths may be set up irrespective of the number of custodial node pairs, also referred to as leader/follower or sender/chooser pairs, that could simultaneously be involved in the restoration operation. The interconnected nodes have bi-directional working and/or spare channels. There is stored at each node in the network participating in the recovery operation a spare channel manifest for each of the leader/follower combinations. The first end node, or leader node, of every identified failed channel initiates a request message for each disrupted working channel to set up an alternate path. Spare channels are assigned to the alternate path so that, with the help of intermediate helper nodes, the request message, guided by the spare channel manifests, is sent to the second end node, or follower node, of the failed channel. An acknowledgement is sent by the follower node back to the leader node on the same path that the request message travelled on. The spare channel manifests are suitably configured to realize desired levels of restoration under various scenarios of failures in the network and are modified as warranted to account for changes in the network.

30 Claims, 12 Drawing Sheets

FIG. 7

AT NODE 101

| 613 | 614 | 616 |
|---|---|---|
| 151 | F | — |
| 152 | F | — |

← 611
← 610

AT NODE 102

| 153 | F | — |
|---|---|---|
| 154 | F | — |
| 155 | F | — |

← 620

AT NODE 103

| 153 | F | — |
|---|---|---|
| 157 | F | — |

← 630

AT NODE 104

| 151 | F | — |
|---|---|---|
| 154 | F | — |
| 157 | F | — |
| 158 | F | — |

← 640

AT NODE 105

| 155 | F | — |
|---|---|---|
| 158 | F | — |

← 650

AT NODE 106

| 152 | F | — |
|---|---|---|
| 156 | F | — |

← 660

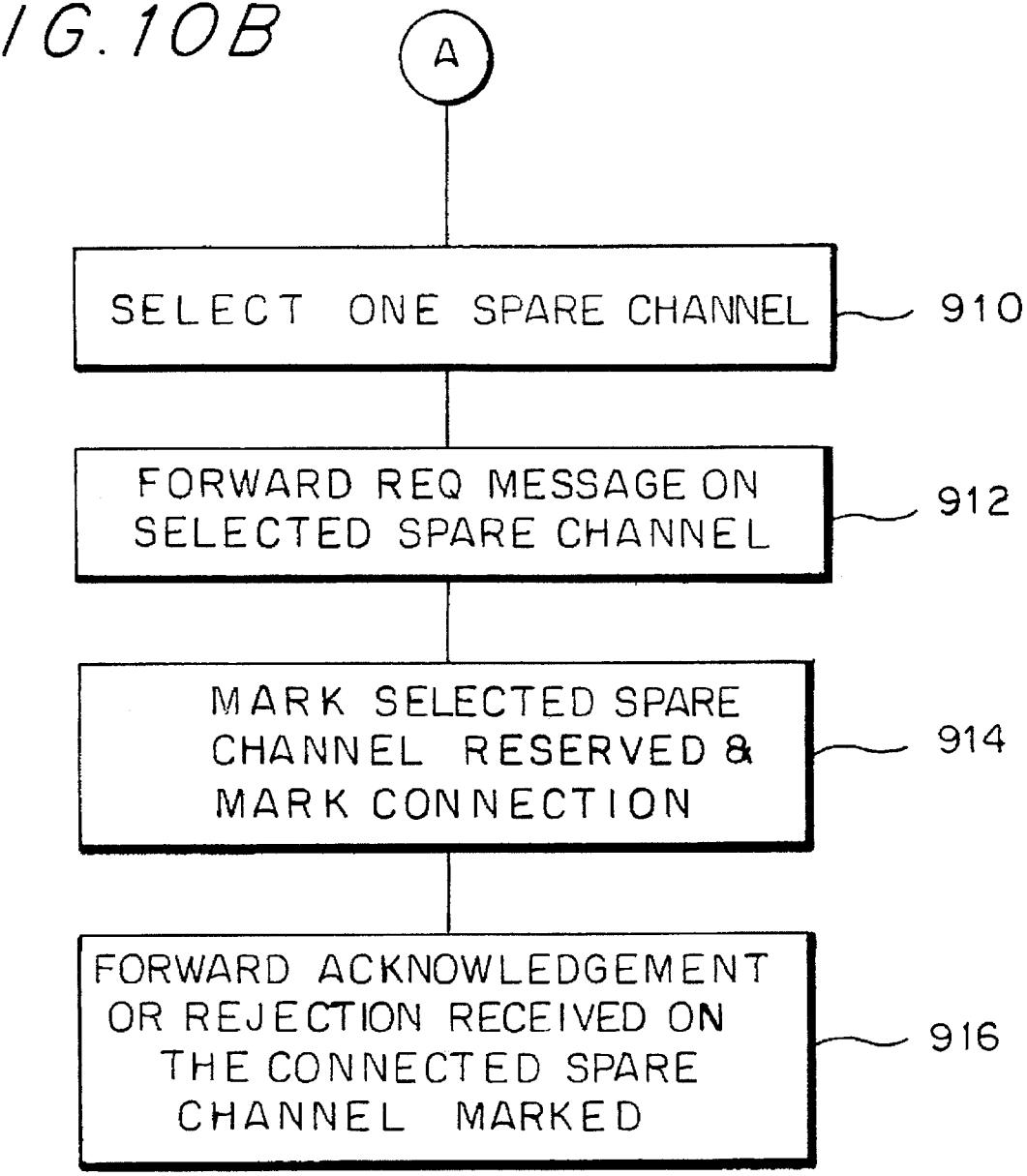

AT NODE 106

AT NODE 104

KNOWLEDGE BASED PATH SET UP AND SPARE CAPACITY ASSIGNMENT FOR DISTRIBUTED NETWORK RESTORATION

FIELD OF THE INVENTION

The present invention relates to a telecommunications network having a plurality of intelligent nodes interconnected by multiple communications links, and more specifically relates to the provisioning of alternate paths and spare capacity assignments for automated restoration of connections in the network disrupted by a failure therein. The alternate paths and spare capacity assignments are realized by using information stored within the network nodes.

BACKGROUND OF THE INVENTION

With the widespread deployment of fiber optic transmission systems in communications networks and the alarming rate of outages due to fiber cuts, there is a serious need to improve the process of restoring traffic disrupted by network failures. So, too, with recent advances in digital crossconnect switch systems (DCSs), there is an increasing interest in utilizing DCSs in network restoration. Such DCS based communications networks are generally organized into a mesh topology, as compared to some other network topologies, so as to realize economic benefits from greater sharing of the transmission facilities in the network.

Automatic restoration techniques for networks having a mesh topology are broadly grouped into two categories: (a) centralized and (b) distributed.

A centralized DCS-based network restoration method requires a central network control center having a database containing derailed information on the network topology and the available transmission resources within the network, and reliable communications links between the DCS nodes and the network control center. Network restoration is achieved by the central control center, which figures out the alternate paths to be used in the event of a failure in the network, communicating appropriate instructions to the participating nodes once it has isolated a failure. The centralized approach, in general, takes longer to restore failed connections than a distributed approach.

There are two basic distributed approaches for mesh network restoration. They are link restoration and path restoration.

The link restoration approach attempts at replacing the affected link segment of a disrupted channel with one or more alternate route segments between the two end nodes of the disrupted link, irrespective of the number of traffic paths or circuits supported by the disrupted link. The path restoration approach, on the other hand, attempts at restoring each disrupted path or circuit within a failed communications link independently of the other disrupted circuits; and generally can provide better utilization of the spare capacity than the link restoration method. A hallmark of the distributed restoration approaches is that, in general, they require very little information at every node in the network for the purposes of recovery from a failure; and by and large, rely upon flooding of messages throughout the network, upon locating the point of failure, to seek alternate paths and to reserve spare capacity for restoring the disrupted connections.

A distributed link restoration approach is described in U.S. Pat. No. 4,956,835, issued Sep. 11, 1990 in the name of Wayne D. Grover. Grover teaches a method whereby, upon locating the failed link, one of the custodial nodes bracketing the link assumes the role of a sender and the other a chooser. Then, on spare channels emanating from it, the sender sends out forward flooding or restoration signatures (or messages), each signature having an unique index, which are rebroadcast by the intermediate nodes and ultimately reaching the chooser. As the forward flooding signatures travel on particular spare links, those spare links are reserved for potential use in restoration of the interrupted connections between the sender and the chooser. Each forward flooding signature arriving at the chooser signifies one potential alternate path that could be used for such restoration. From the available alternate paths the chooser makes one or more selections as may be necessary to restore the traffic lost on the failed link.

An inherent characteristic of the distributed restoration technique such as the one described above is that, in general, far more spare capacity than necessary gets reserved for the restoration of a failed link. Because of this phenomenon, a shortcoming of the aforementioned link restoration technique is that, when a single failure cuts across multiple links such that multiple sender—chooser pairs simultaneously invoke recovery, even when there is sufficient spare capacity to restore traffic on all of the failed links, not all sender—chooser pairs might succeed in their quest to restore traffic on their respective failed links. This is due mainly to the misappropriation of the spare capacity.

This shortcoming is illustrated with the network in FIGS. 1A to 1B. In FIG. 1A, a cut at point 170 severs links 121 and 123 and consequently severs working channels 131 and 133, along with spare channels 151 and 153. For sake of clarity, all working channels and spare channels are each assumed to possess transmission capacity of one trait. The object of restoration, as discussed herein, is to find alternate paths with sufficient spare capacity for rerouting the traffic on the severed working channels only. No attempt is made to restore the failed spare channels.

Sender 101 and chooser 104 in combination attempt to restore the traffic on working channel 131, whereas sender 102 and chooser 103 attempt to restore the traffic on working channel 133. Upon locating the fault, sender 102 sends out forward flooding or restoration signature 181 on spare channel 154, signature 182 on spare channel 155, and signature 183 on spare channel 156. Similarly, sender 101 sends out forward flooding signature 191 on spare channel 152. As a signature travels on a spare channel, the particular spare channel is reserved for the alternate path, if any, that the signature might ultimately help create.

The forward flooding signatures get rebroadcast as shown in FIG. 1B, where node 104 forwards signature 181 on spare channel 157 and node 105 forwards signature 182 on spare channel 158. Signatures 183 and 191 do not advance as there are no free spare channels available. At the next step, signature 182 also gets blocked due to lack of a spare channel. In FIG. 1B, forward flooding signature 181 finally reaches chooser 103 signifying that the path travelled by that signature, namely the path comprising spare channels 154 and 157, can be used to restore the traffic carried by working channel 133. However, the flooding actions of sender 102 are responsible for reserving additional spare channels 155, 156, and 158, which although not used in the restoration of traffic on working channel 133, do block restoration of traffic on working channel 131. Putting it simply, the process of simultaneous restoration for the cut express link between node pair 101 and 104 is blocked by the restoration process of node pairs 102 and 103. This blockage may be a temporary phenomenon where some fixes can be devised, but cases can be demonstrated in the network where such a fix is not possible, thus rendering the method to be unreliable.

SUMMARY OF THE INVENTION

The present invention sets up alternate paths and assigns spare channels on such alternate paths in a communications network having a plurality of intelligent nodes interconnected by a plurality of communications links to restore traffic disrupted by a failure affecting one or more of the communications links, irrespective of however many different custodial or adjacent node pairs are simultaneously involved in the recovery operation.

For the present invention, assume every communications link in the network comprises one or more working channels and/or one or more spare channels. In terms of definition, working channels carry communications traffic between the nodes they interconnect, and spare channels are put in service to reroute disrupted traffic. Further, all working and spare channels are assumed to be bi-directional in their ability to carry traffic between connected nodes. It is moreover assumed for the present invention that severed spare channels need not be restored.

Upon locating a failure, one end node of each failed link invokes its arbitrarily predesignated role as a leader or sender, and the other end node of the failed link a follower or chooser. The leader and follower are the custodial or adjacent nodes of the link. Other nodes participating in the recovery operation perform functions as helpers, which are intermediate or tandem nodes on alternate paths targeted for restoration of traffic on a failed link. To facilitate recovery by forming alternate paths and assigning spare channels on such alternate paths, according to the present invention, there is stored in a storage or memory at each node of the network a spare channel manifest containing every leader/follower combination failure scenario for which that node would participate in. There is also stored in the memory at each node in the network an assignment record on each spare channel attached to the node for keeping track of the status of the spare channel. Some other information may also be stored in the memory.

Upon identifying the failed link, the leader accesses the spare channel manifest for the leader/follower combination from its memory, selects from the manifest as many spare channels as might be required to restore the traffic on the disrupted working channels, accesses the assignment records for the selected spare channels, sends out a request or restoration message with an identifier of the leader, the follower, and the disrupted working channel on each of the selected spare channels which is free or available, and marks the selected spare channels as having been reserved for the disrupted working channel.

A helper, upon receipt of a request message on a spare channel, extracts the leader/follower identifier from the request message and makes a note of the spare channel on which the request message was received. The helper further accesses the spare channel manifest from its memory for the extracted leader/follower combination to select one spare channel. It then accesses the assignment record for the selected spare channel, forwards the request message if the channel is free, and marks the two spare channels as being reserved and connected to each other in their respective assignment records at the helper node.

The follower, upon receipt of a request message on a spare channel, changes it to an acknowledgement message containing the same identifier of the leader, the follower, and the working channel and sends it back on the spare channel on which the request message was received, and marks the spare channel as having been reserved for the disrupted working channel in the assignment record for the spare channel in the follower's memory. Assisted by the helpers, the acknowledgement message reaches the leader via the same path the request message travelled on to get from the leader to the follower.

In this manner, the leader, the helpers, and the follower associated with each failed link cooperate to set up in parallel alternate paths and assignments of spare channels such that the restoration of traffic on the failed working channels from all failed links can simultaneously be achieved.

In the event that a helper, upon receipt of a request message, cannot find a free spare channel in the manifest for the leader/follower combination in question, it changes the request message into a reject message and sends it back toward the leader via the intervening helpers. Previously reserved spare channels on the alternate path are set free by the nodes upon encountering the reject message.

The spare channel manifests are suitably configured to realize desired levels of restoration under various scenarios of failures in the network and are modified as warranted to account for changes in the network.

Accordingly, to the extent that spare channels are available, it is an objective of the present invention to set up alternate paths and assign spare channels on such alternate paths for restoring traffic disrupted by a failure affecting one or more of the communications links in a telecommunications network.

It is another objective of the present invention to restore disrupted traffic between multiple leader/follower node pairs all being simultaneously involved in recovery operations.

BRIEF DESCRIPTION OF THE FIGURES

Other objectives and advantages, in addition to those mentioned above, of the present invention will become more apparent and the invention will be best understood by reference to the following description of the preferred embodiment of the invention taken in conjunction with the accompanying drawings, wherein:

FIG. 7 depicts assignment records as they would appear when initially installed at the nodes in the network of FIGS. 1A, 1B and 2;

FIGS. 10A and 10B together provide a flow chart depicting the essential steps of the present invention from the perspectives of a helper node and a follower node.

DETAILED DESCRIPTION OF THE INVENTION

Figure 2:
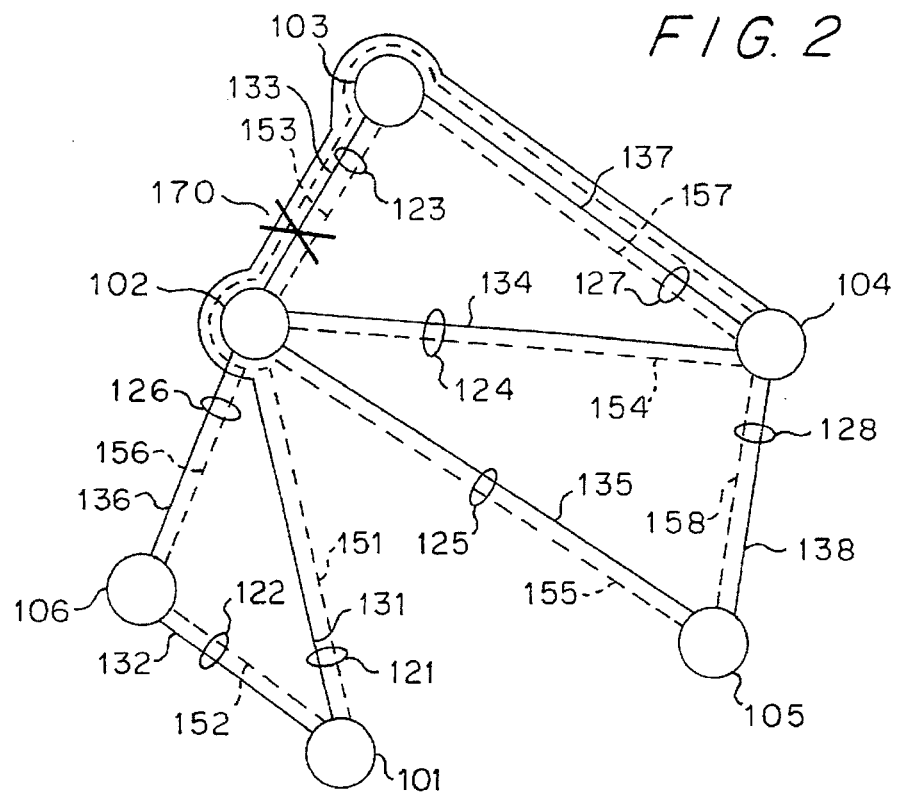
FIG. 2 is an illustration of a simplified communications network for explaining both a prior art link restoration technique and the present invention.

Illustrated in FIG. 2 is an exemplar simplified communications network comprising nodes 101 to 106 interconnected by communications links 121 to 128. Assume that any two connected nodes in the FIG. 2 network are connected by only one communications link. Note, however, that this is not a limitation of the present invention insofar as there may actually be more than one link connecting any two nodes in the network. Further note that communications link 121 is an express link or glass through connecting node 101 to node 104, thereby bypassing nodes 102 and 103. Such express link arrangements are frequently deployed in communications networks to realize economic efficiencies.

Figure 1A:
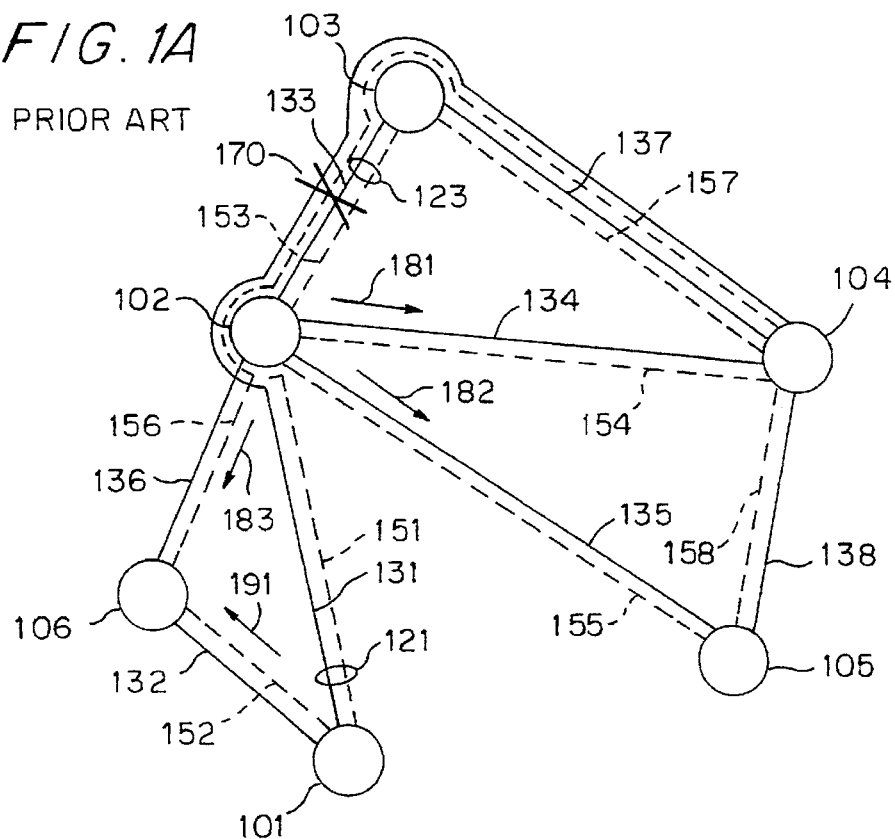
FIGS. 1A and 1B are network topologies each being illustrative of a prior art distributed link restoration technique where two sender/chooser pairs result from the simultaneous failure of two working channels.
Figure 1B:
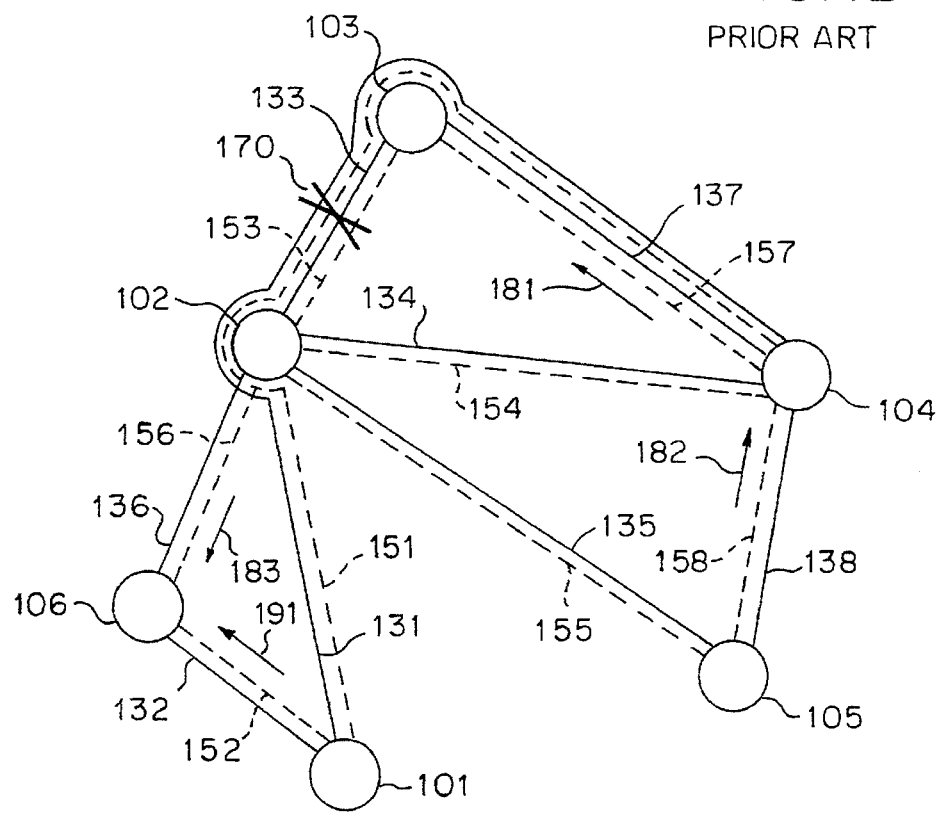

A communications link may contain one or more working channels to carry actual communications traffic between the nodes that it interconnects, and/or may contain one or more spare channels which are kept in reserve. When there is a failure in the network, the spare channels may be put in service to carry alternate routed traffic. Shown in FIG. 2 are working channels 131 to 138, depicted by solid lines, and spare channels 151 to 158, depicted by broken lines, of different communications links. Again, for the sake of simplicity, only one working channel and one spare channel are shown per link in the network of FIG. 2. For the present invention all working channels and all spare channels are assumed to be capable of carrying bi-directional traffic. Communications circuits or paths to carry traffic between any designated nodes are formed from working channels 131–138. Such communications circuits or paths however are not shown in FIGS. 1A, 1B and 2.

Figure 3:
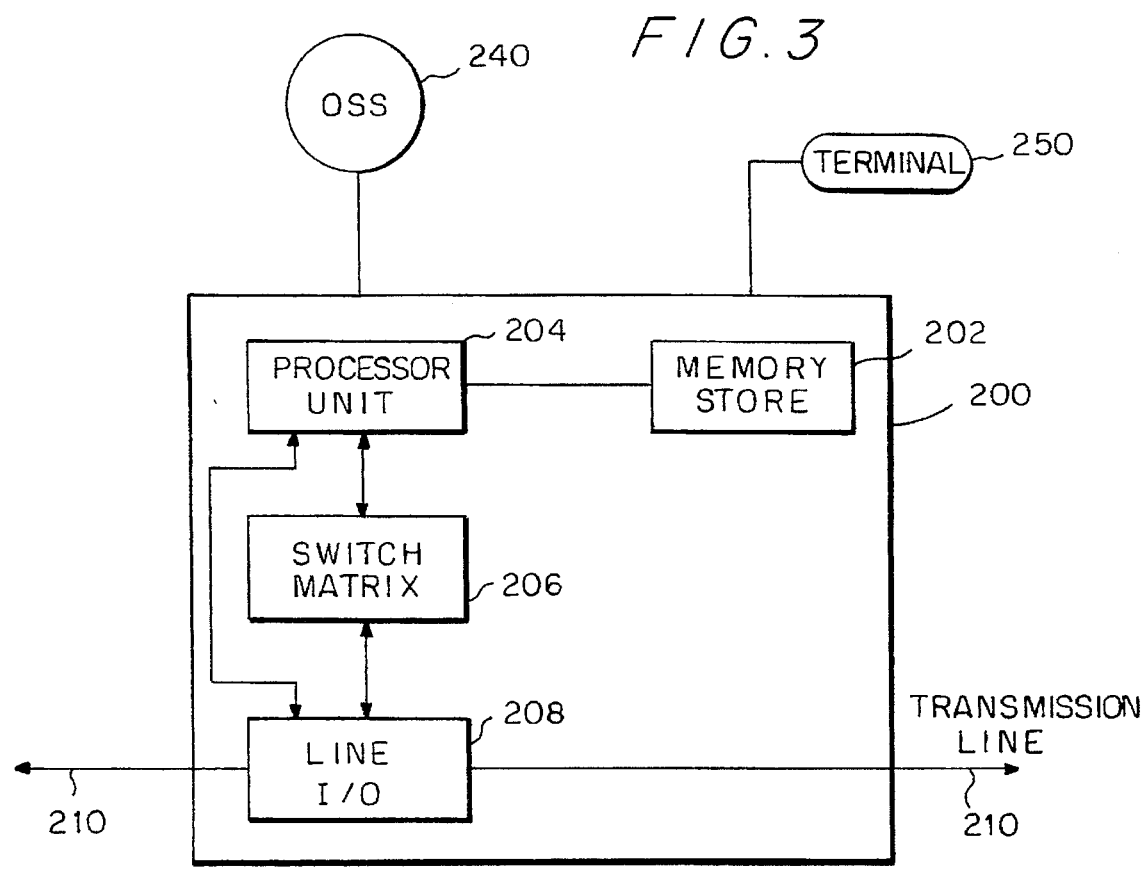
FIG. 3 is a diagram of a digital cross-connect system which may be deployed as an intelligent device at each node in the network.

Every one of the nodes 101–106 in the network of FIG. 2, for the present invention, is assumed to comprise an intelligent device such as a digital cross-connect switch (DCS) 200 shown in FIG. 3. DCS 200 comprises a memory store 202, a processor unit 204, a switching matrix unit 206, and a line I/O unit 208 interfacing with transmission lines 210 which forms the communications links in the network. Also shown in FIG. 3 is an Operational Support System (OSS) 240 and a terminal 250 both of which interface with DCS 200.

Figure 4:
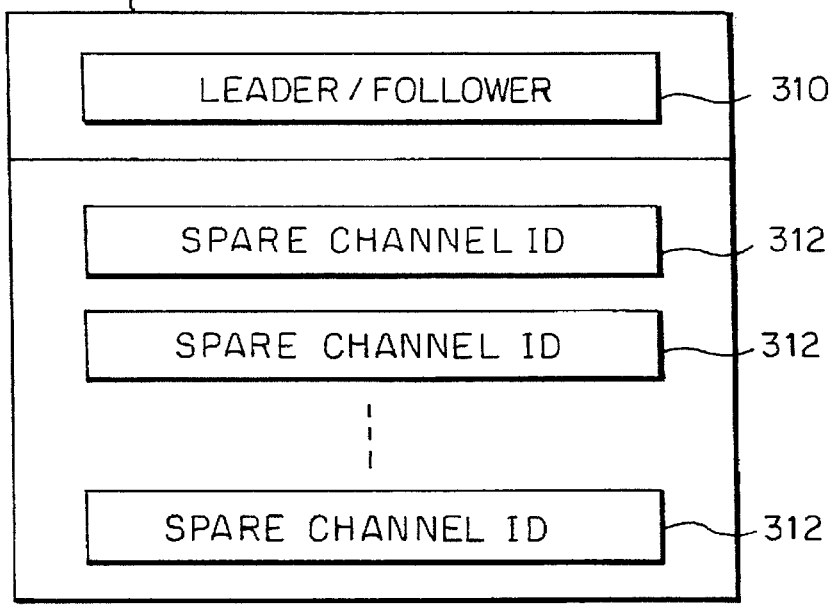
FIG. 4 is a diagram of a generic spare channel manifest stored at a node in the network.

A spare channel manifest 300, having the format shown in FIG. 4, includes a leader/follower identifier 310 and spare channel identifiers 312. Although not explicitly shown as such in FIG. 4, the leader/follower identifier of manifest 300 further includes the respective identifications (IDs) of the leader node and the follower node. One spare channel manifest 300 having each leader/follower combination for a particular node is stored in memory 202 at that node, which incidentally has its own ID. The spare channel manifest stored in memory 202 may be modified by either OSS 240, or other means such as for example terminal 250 shown in FIG. 3.

Figure 5:
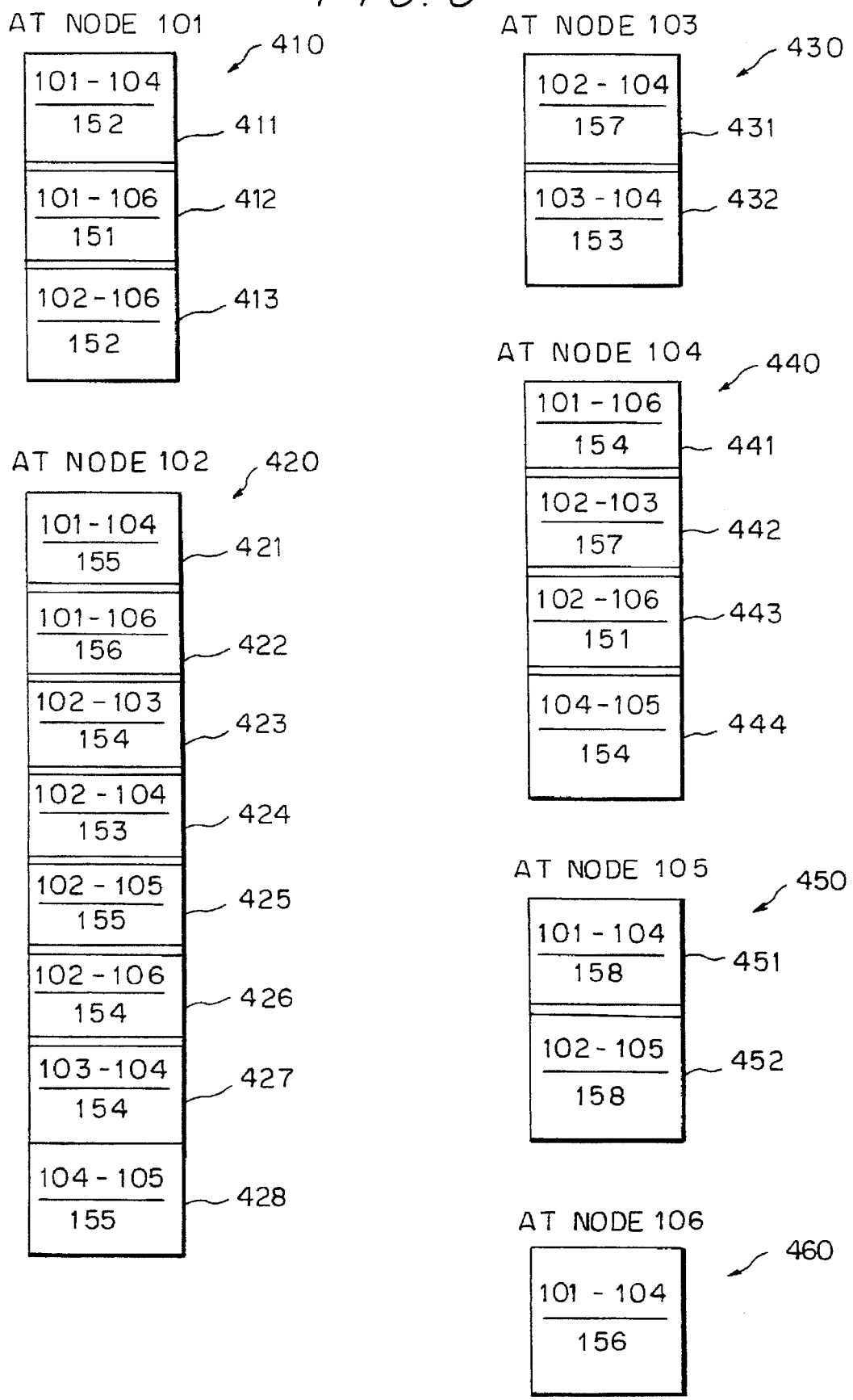
FIG. 5 depicts spare channel manifests at all nodes in the network of FIGS. 1A, 1B and 2.

Illustrated in FIG. 5 are spare channel manifests 410 to 460 stored at the respective nodes of the network of FIG. 2. These manifests may be provisioned by the management of the network via OSS 240 or terminal 250, or some other input/output means to the respective nodes. Such provisioning may be done by a spare capacity planning tool disclosed for example in an application by Russ el. al. entitled "System And Method Therefor Of Estimating Optimal Spare Capacity For A Distributed Restoration Scheme", to be assigned to the same assignee as the instant invention and filed on Jun. 22, 1995 having Ser. No. 08/493,477. In brief, provided with predefined engineering guidelines and design criteria, such spare capacity planning tool would generate an optimal spare capacity for a network topology with a given number of nodes and links. Spare capacity planning tools that can be used to derive the needed information are manufactured by a number of companies including for example TR Labs, British Telecom and MCI Telecommunications Corporation.

In essence, each manifest contains the information that directs the reaction of a node to a failure by providing a particular spare link that the node is to use when a certain fault occurs at a given location of the network. For example, spare channel manifest 410 at node 101 indicates at identifier 411 that spare channel 152 is to be used as part of the alternate route if there is a fault at a location between leader 101 and follower 104. Similarly, identifier 412 indicates the relationship between leader/follower 101,106 and spare channel 151; and identifier 413 shows the relationship between leader/follower 102,106 and spare channel 152. As shown in FIG. 5, the numbers of identifiers of the manifests are different. This is due to the fact that each node of the network may be utilized as part of different possible alternate paths. So, too, the manifests may be modified as needed in response to changes in the network since the network topology is not static.

Figure 6:
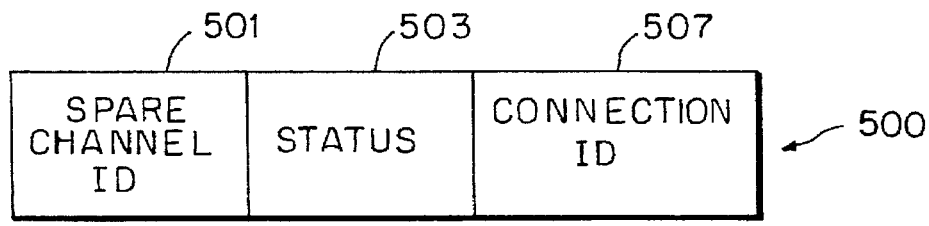
FIG. 6 is an illustration of an exemplar format of an assignment record of a spare channel stored at a node in the network.

Illustrated in FIG. 6 is an exemplar spare channel assignment record 500 having spare channel identifier at 501, spare channel status at 503, and identifier of another spare channel to which this spare channel may be connected to at 507. The spare channel status is defined as unavailable (U), or free or available (F), or reserved (R). At the leader and the follower nodes, field 507 is used to record the identifier of the disrupted working channel for which the particular spare channel is reserved for.

Spare channel assignment records for the nodes in the network of FIG. 2 are shown in FIG. 7. Assume node 101 has record 610, node 102 record 620, node 103 record 630, node 104 record 640, node 105 record 650, and node 106 record 660. The number of identifiers at each assignment record is dependent on the number of spare links connected to the node represented by that assignment record. For example, the first record at node 101 indicates at field 613 the spare channel identifier 151 (for link 151), at field 614 the spare channel status which happens to be free (F), and at field 616 the connection of the spare channel to any other spare channel. Note that field 616 is blank since the spare channel is not connected to any other spare channel. Likewise, the second record of node 101 has spare channel identifier 152 (for link 152) and a free (F) indication at the next field and blank entry at the last field. The spare channel assignment records, similar to the channel manifests shown in FIG. 5, may also be provisioned by the network management via OSS 240, terminal 250 or some other transceiver means.

Figure 8:
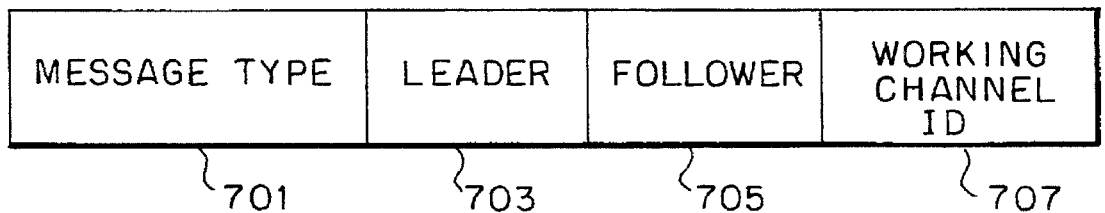
FIG. 8 is an exemplar format of the message used for communications between the nodes in the network during alternate path set up and spare channel assignment according to the present invention, the message type being a request (REQ) message, an acknowledgement (ACK) message, or a reject (REJ) message.

Messages transmitted in the present invention utilize the format depicted in FIG. 8. The type of message is identified per message type field 701 as either REQUEST (REQ), ACKNOWLEDGMENT (ACK), or REJECT (REJ). Leader field 703 identifies the leader, and follower field 705 identifies the follower. Field 707 identifies the disrupted working channel bracketed by the leader and the follower When a failed link is identified (using for example a conventional method), the nodes in the network bracketing the failed link assume their predetermined roles. Accordingly one node becomes the leader (sender) and the other the follower (chooser).

Figure 9:
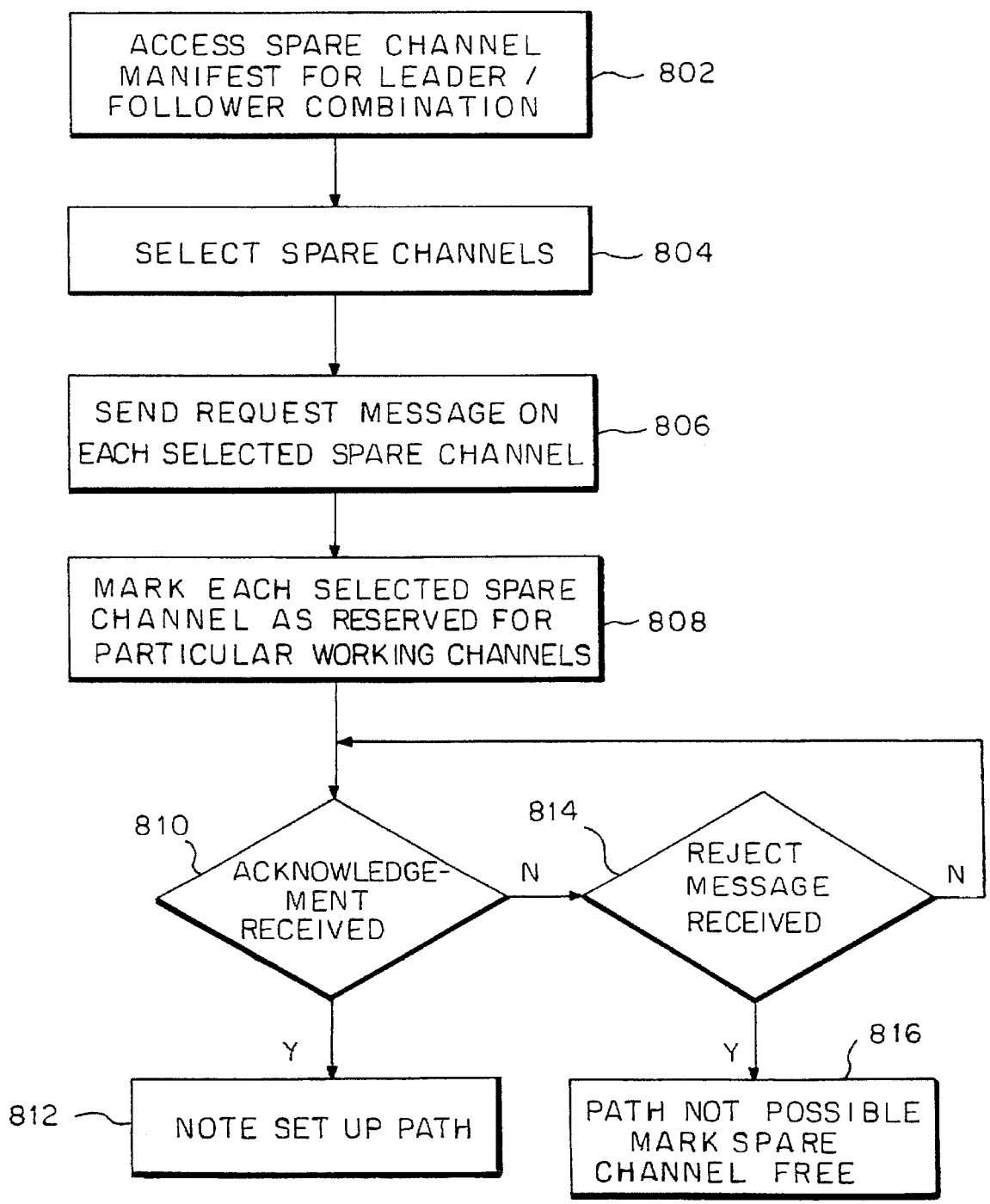
FIG. 9 is a flow chart depicting the essential steps of the process of the present invention from the perspective of a leader node.

The steps taken by the leader node according to the present invention are illustrated in the flow chart of FIG. 9. Starting at 802, the leader accesses the spare channel manifest for the leader/follower combination. Next the leader selects from among the spare channels identified as free the number of the spare channels to restore the traffic on the disrupted working channels at 804. The leader then sends a REQ message containing the leader, the follower, and the disrupted working channel identifier on each of the selected spare channels at 806, and marks the status for each selected spare channel in the manifest as reserved (R) for the working channel at 808. At 810 the leader checks for the ACK message from the follower for each of the selected spare channels. If an ACK message is received then that message signifies that the corresponding alternate path was successfully set up with the associated spare channels assigned to the path. The leader then makes a note of the path set up in this manner at 812. The leader also checks to see if a REJ message is received at 814, and if one is received then it signifies that an alternate route was not possible and the leader marks the associated spare channel as free (F) at 816.

Figure 10A:
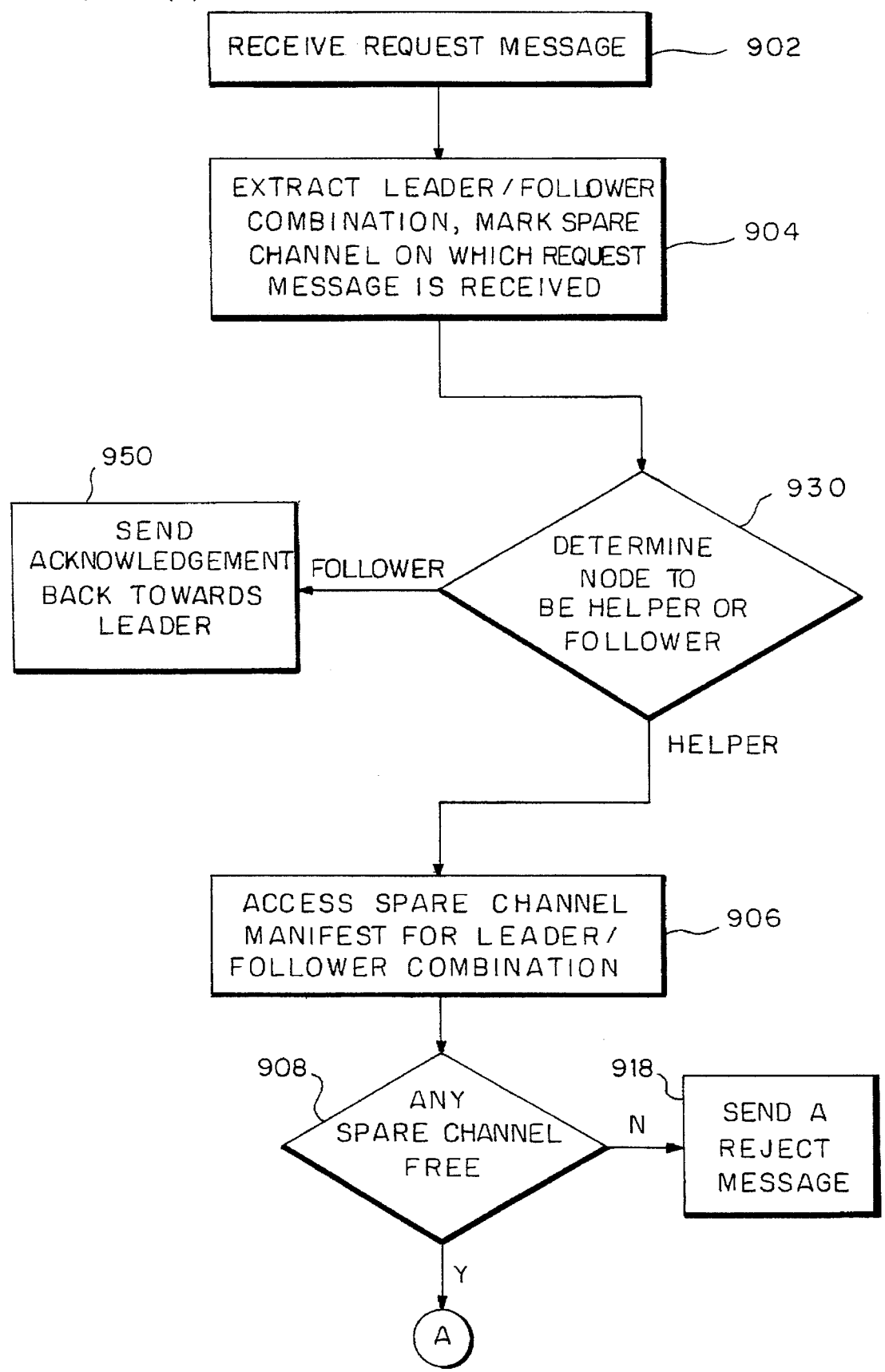

The further steps according to the process of the present invention are illustrated in FIGS. 10A and 10B. At 902, upon receipt of a REQ message on a spare channel, a node extracts the leader/follower identification from the REQ message. It then makes a note of the spare channel on which the REQ message was received and marks the spare channel as being reserved at 904. The node next checks to see if the follower identifier matches its own identifier at 930. If it does not match, the node is determined to be a helper.

The helper then accesses the spare channel manifest associated with the leader/follower combination at 906. The helper next checks for free spare channels at 908. If there is a free spare channel available, the helper selects it at 910, forwards a REQ message on the selected spare channel at 912, and marks the selected spare channel as reserved (R) and marks the REQ receiving and REQ forwarding spare channels as being connected at 914. If the helper discovers that there is no free spare channel in the manifest, it modifies the REQ message into an REJ message and sends it back towards the leader, via the spare channel on which the helper received the REQ message, at 918. When the helper receives an ACK message, it forwards the ACK message at 916 towards the leader on the spare channel connected to the spare channel on which the ACK message was received.

If at 930 it is determined that the follower identifier matches the node identifier, the node is deemed the follower. The follower returns an ACK message back towards the sender on the spare channel on which it received the REQ message at 950.

Figure 11A:
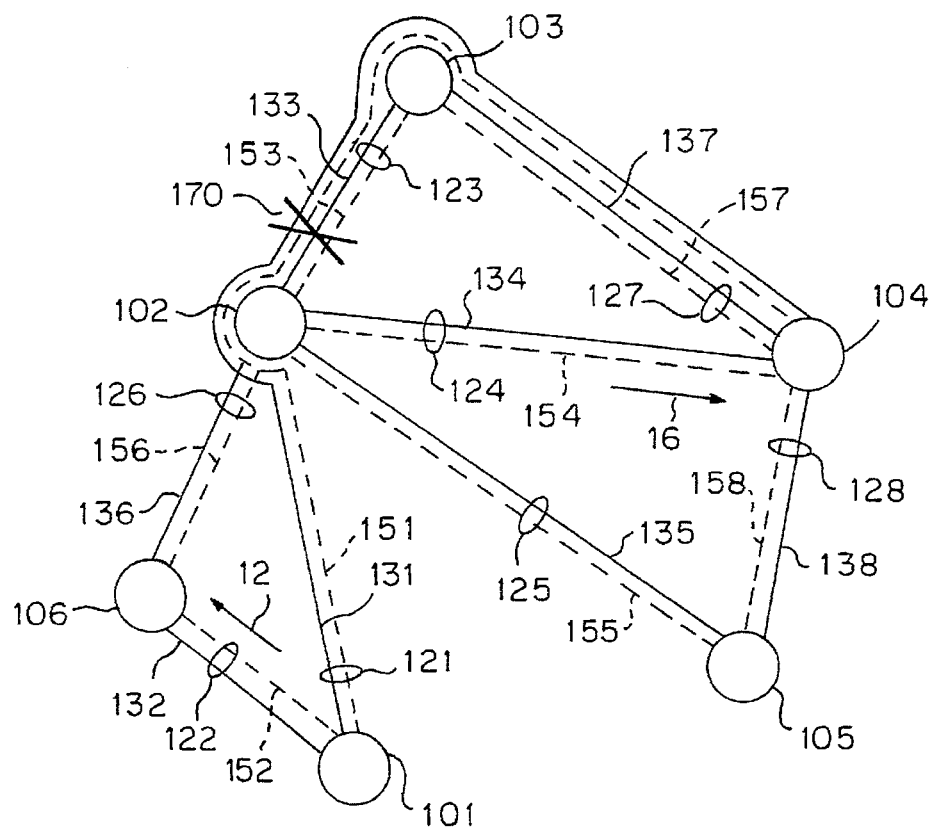
FIG. 11A–11B, 12A–12B, 13A–13B and 14A–14B are illustrations for further explaining the alternate path set up and spare channel assignment operations of the present invention when there is a simultaneous failure of two working channels.

The inventive process described above is illustrated in FIGS. 11A–11B to 14A–14B. Supposing that there is a failure at point 170 in the network of FIG. 11A, communications links 121 and 123 are simultaneously severed causing the traffic on working channels 131 and 133 to be disrupted and making spare channels 151 and 153 unavailable for service. Upon locating the fault, node 101 and node 104, having been predesignated as such, assume the role of the leader and follower nodes, respectively, to restore the traffic disrupted on working channel 131. Similarly, node 102 becomes the leader and node 103 the follower to restore the disrupted traffic on working channel 133. Nodes 101 and 104 change the status to unavailable (U) for spare channel 151, and nodes 102 and 103 do the same for spare channel 153 in the appropriate assignment records.

Figure 11B:
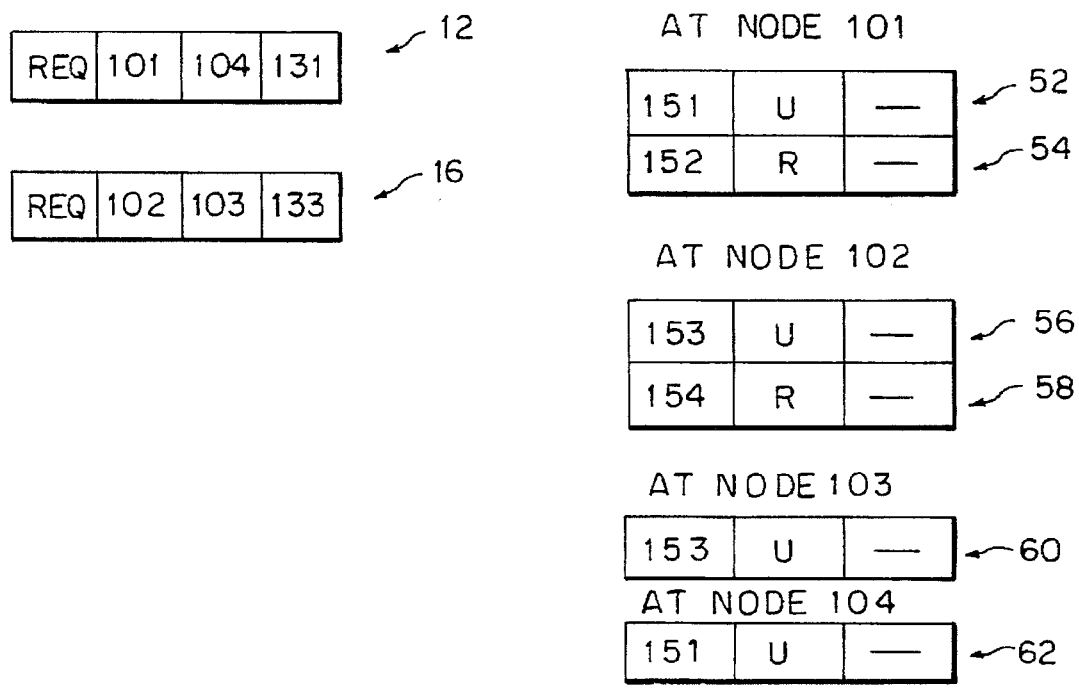

Such assignment records are shown in FIG. 11B. For example, spare channel 151 at node 101 is indicated by 52, spare channel 151 at node 104 by 62, spare channel 153 at node 102 by 56, and spare channel 153 at node 103 by 60. Leader 101 accesses from its memory the spare channel manifest assigned to the leader/follower combination 101–104 and determines that spare channel 152 (at 411 in FIG. 5) is a candidate for deployment in the restoration in question. Leader 101 then checks the assignment record for spare channel 152 (at 610 in FIG. 7). Finding that it is a free channel, leader 101 selects it for constructing an alternate route for the restoration. A REQ message 12 is sent out on spare channel 152 with the leader/follower combination 101–104 and the working channel identifier 131. The assignment record in the memory at node 101 is updated, at 54, by identifying spare channel 152 as reserved (R) for the working channel 131. Leader 101 then enters a wait state to await receipt of either an ACK message or a REJ message in response to its REQ message 12.

Similarly, accessing from its memory the spare channel manifest assigned to the leader/follower combination 102 103, leader 102 determines that spare channel 154 (at 423 in FIG. 5) is a candidate for deployment in the restoration in question. Leader 102 then checks the assignment record for spare channel 154 (at 620 in FIG. 7) and finding that it is a free channel selects it for constructing an alternate route for the restoration. Leader 102 next sends out a REQ message 16 on spare channel 154 with the leader/follower combination 102–103 and the working channel identifier 133, updates assignment record 58 in the memory at node 102 by marking spare channel 154 as reserved (R) for the working channel 133 and enters a wait state to await receipt of either an ACK message or a REJ message in response to its REQ message 16. As shown, REQ message 12 is transmitted to node 106 while REQ message 16 is transmitted to node 104.

Figure 12A:
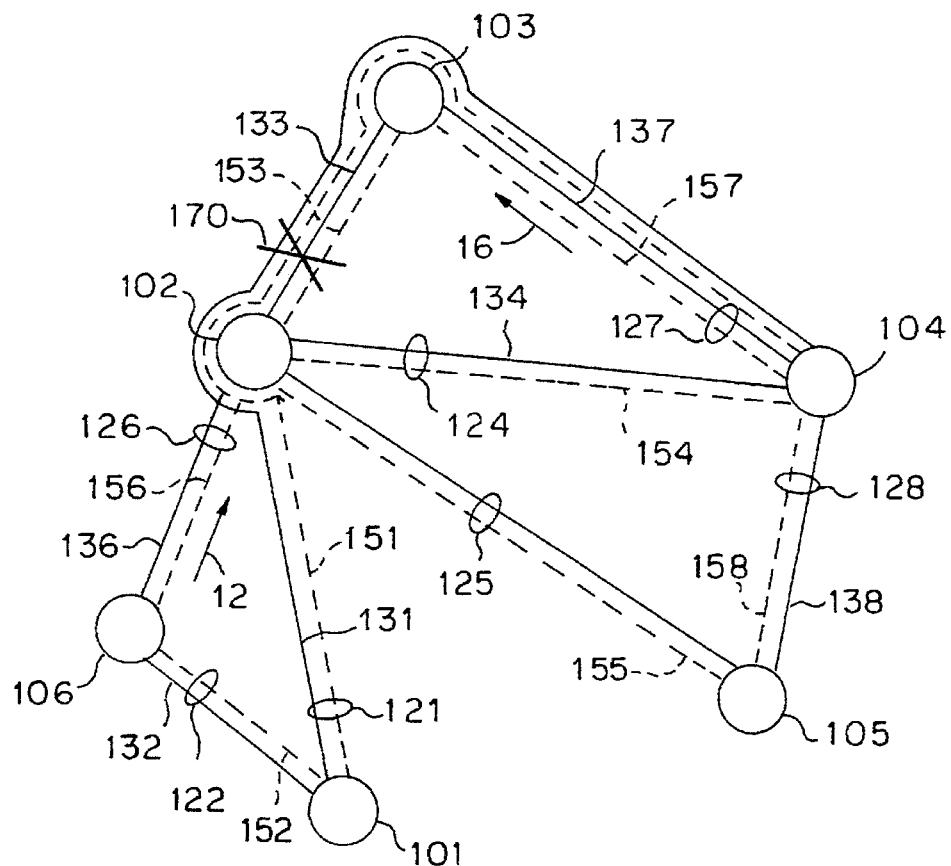

The next series of steps illustrating the present inventive process are explained with reference to FIG. 12A. Node 106, upon receipt of REQ message 12, extracts the leader/follower pair 101–104 from the message, and makes a note of the spare channel on which the REQ message was received. The spare channel in this case is 152. Further, node 106 checks the status for spare channel 152 in the assignment record at the node; and finding that the spare channel is free, node 106 updates the assignment record as shown at 64A to reflect that spare channel 152 is now reserved (R). Then node 106 compares its own node identifier (ID) with that of the follower node extracted from REQ message 12 to determine if the two node IDs are the same. Node 106, having determined that its ID is not the same as that of the follower ID 104, assumes the role of a helper. Helper 106 then accesses its spare channel manifest for the leader/follower pair 101–104 to find that spare channel 156 is a candidate to satisfy spare capacity request in REQ 12. See 460 in FIG. 5. Helper 106 further determines from the assignment record for spare channel 156 at node 106 that the channel is free. See 660 in FIG. 7. Having done so, helper 106 selects spare channel 156 for assignment per REQ 12 and forwards REQ 12 onward on spare channel 156. Assignment record 66 for spare channel 156 is then updated at node 106 to show that spare channel 156 is reserved and connected to spare channel 152. Helper 106 also updates assignment record as shown at 64B indicating that spare channel 152 is connected to spare channel 156. Helper 106 then enters a wait state to await receipt of either an ACK message or a REJ message in response to the REQ message 12.

Following the process similar to as described above for node 106, node 104 discovers that it is a helper in search of an alternate path by the leader/follower combination 102–103. In other words, upon receiving REQ message 16, node 104 selects spare channel 157 (442 in FIG. 5) to forward REQ message 16 and updates assignment record 68 for spare channel 154 and assignment record 70 for spare channel 157. Helper 104 then enters a wait state to wait for a message in response to REQ message 16. In this instance, REQ message 12 is transmitted to node 102 while REQ message 16 is transmitted to node 103.

Figure 12B:
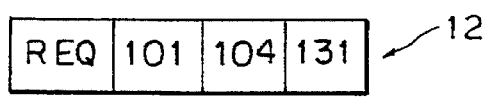
Figure 12B:
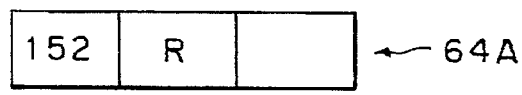
Figure 12B:
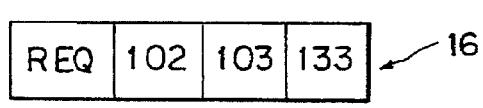
Figure 12B:
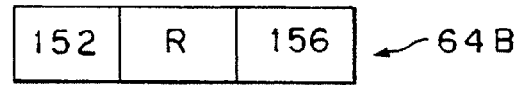
Figure 12B:
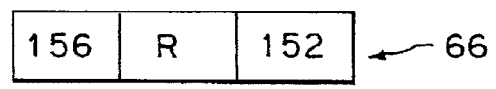
Figure 12B:
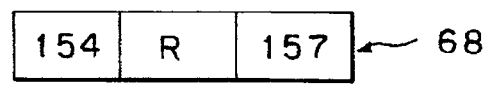
Figure 12B:
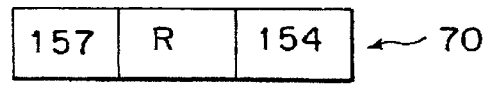
Figures 13A, 13B:
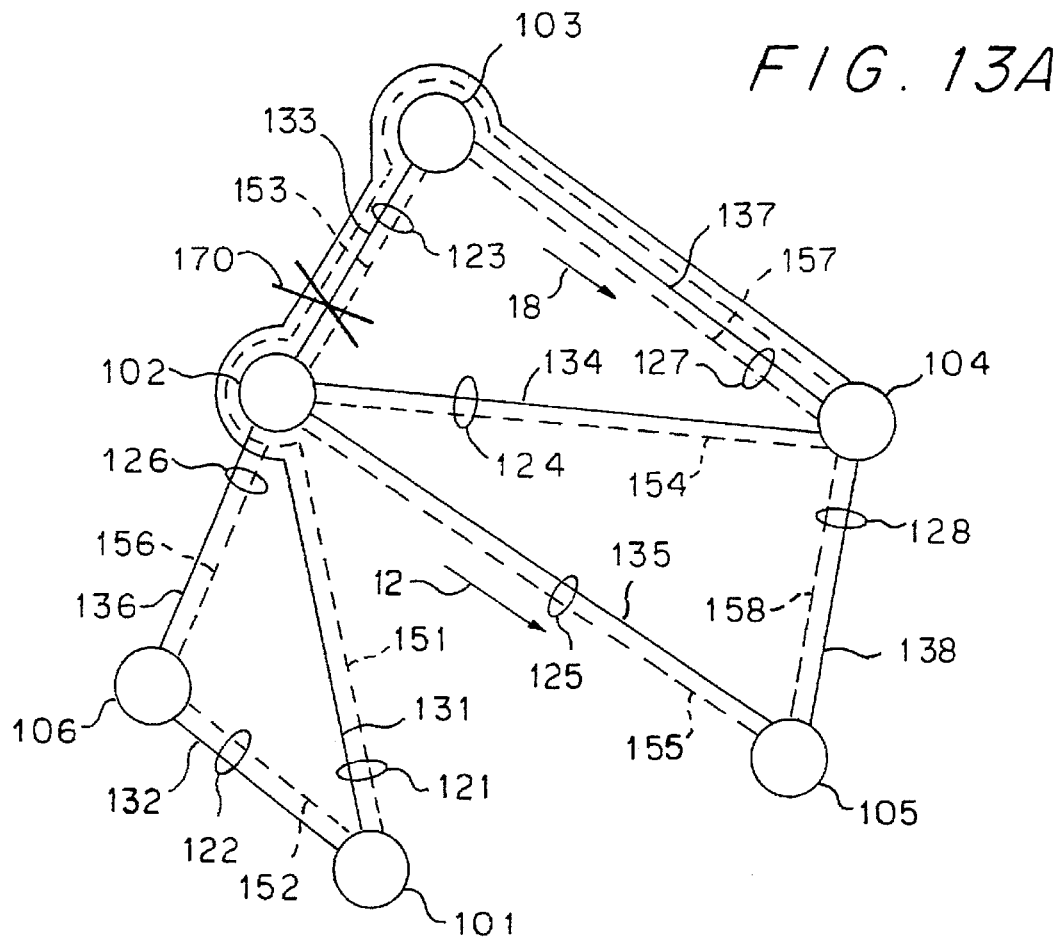

The present inventive process is further shown in FIGS. 13A and 13B. Again, similar to the process described per FIG. 12B above for node 106, node 105 discovers that it is a helper for setting up an alternate path sought by the leader/follower combination 101–104. Putting it differently, node 105, upon receiving REQ message 12 on spare channel 155, selects spare channel 158 to forward REQ message 12. Node 105 next updates assignment record 72 for spare channel 155 and assignment record 74 for spare channel 158, and then waits for a message in response to REQ message 12.

Node 103, upon receiving REQ message 16, extracts the leader/follower pair 102–103 information from the message, and makes a note of the spare channel on which the REQ message was received. The spare channel in this case is 157. Node 103 then checks the status of spare channel 157 in the assignment record at the node. Finding that the spare channel is free, node 103 updates the assignment record as shown at 76A in FIG. 13B to indicate that spare channel 157 is reserved (R). Node 103 then compares its own node identifier (ID) with that of the follower node extracted from REQ message 16 to determine if the two node IDs are the same. Finding that the two IDs are the same, node 103 recognizes that it is the follower in this case. Thereafter, follower 103 converts REQ message 16 into ACK message 18 and sends it toward the leader on spare channel 157, the same spare channel on which follower 103 received REQ message 16. Follower 103 further updates the assignment record as shown in 76B indicating that spare channel 157 is assigned to disrupted working channel 133. In this instance, REQ message 12 is transmitted to node 105 while ACK message 18 is transmitted to node 104.

Figure 14A:
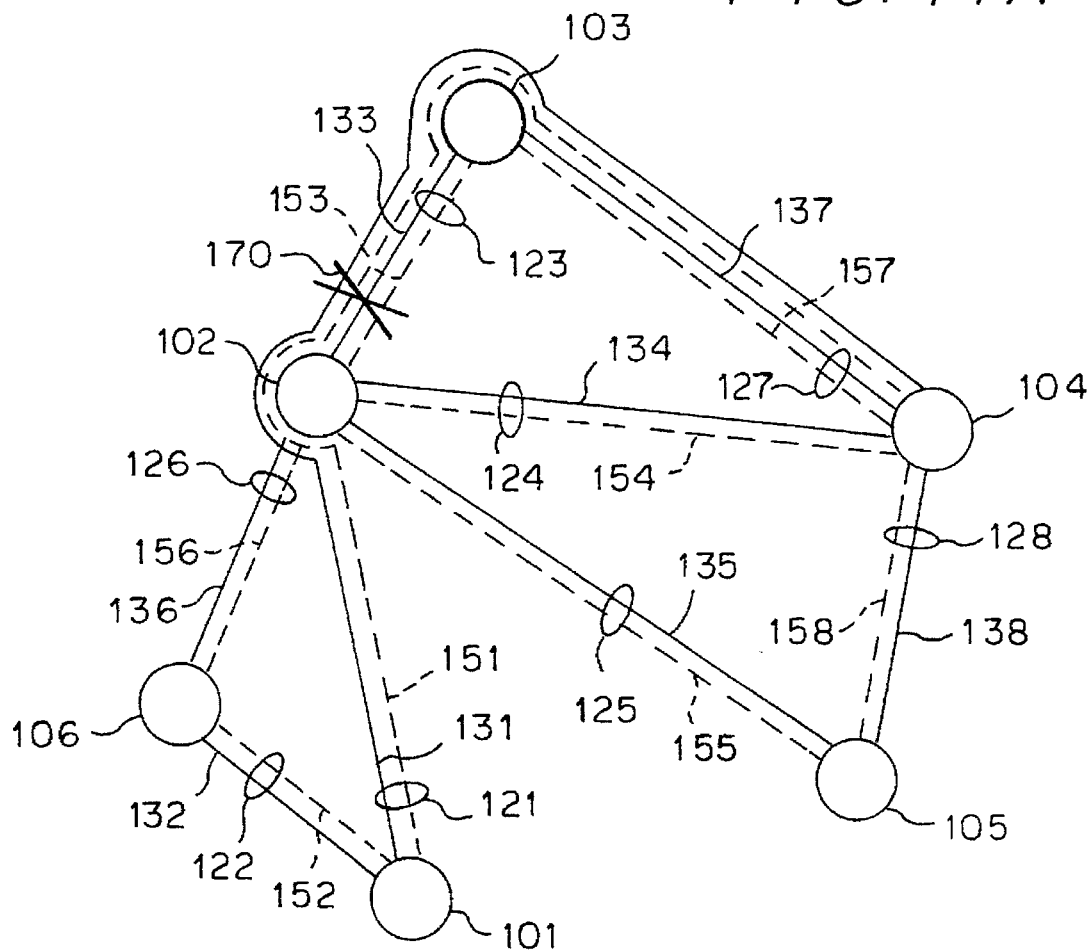
Figure 14B:
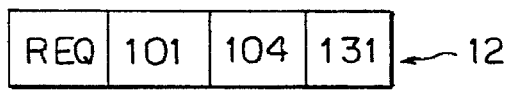
Figure 14B:
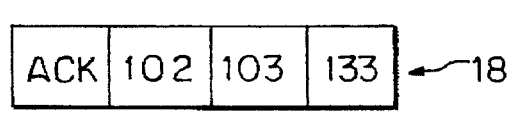
Figure 14B:
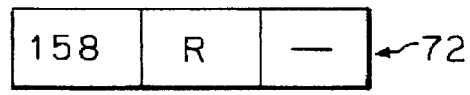
Figure 14B:
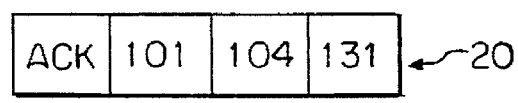

Continuing in this fashion, with reference to FIG. 14A and 14B, REQ message 12 reaches node 104 on spare channel 158. By following the steps similar to those described above for node 103 (FIGS. 13A and 13B), node 104 determines that it is indeed the follower node in the leader/follower combination carried by REQ message 12. Follower 104 then updates assignment record 72 for spare channel 158 and sends ACK message 20 towards leader 101 on spare channel 158.

Meanwhile, upon receipt of ACK message 18 on spare channel 157, helper 104 retrieves the assignment record from its memory for spare channel 157 and determines from the assignment record 70, shown in FIG. 12B, that spare channel 157 is connected to spare channel 154. Helper 104 then forwards ACK message 18 on spare channel 154.

Leader 102, upon receiving ACK message 18 on spare channel 154, the same spare channel on which leader 102 first transmitted REQ message 16, decides that an alternate path for restoring the traffic on faulty working channel 133 has been set up. Furthermore, since each of the spare channels used in the alternate path has the same capacity as working channel 133, there is therefore also assigned on the alternate path sufficient spare capacity to restore traffic that was on working channel 133. In other words, the alternate path for leader/follower nodes 102 and 103 comprises spare channel 154, helper node 104 and spare channel 157.

Although not explicitly shown in FIG. 14B and described in detail herein, ACK message 20 from follower 104 would travel the path formed by spare channel 158, helper 105, spare channel 155, helper 102, spare channel 156, helper 106, spare channel 152, and finally leader 101. This alternate path also would have spare capacity sufficient to restore the traffic that was on working channel 131. Thus, traffic on both disrupted working channels 131 and 133 could be successfully restored simultaneously.

If at any point in the process described above, no free spare channel is available for a node to move the REQ message forward to set up the alternate path, that node would convert the REQ message into an REJ message and send the REJ message back on the same spare channel from which it received the REQ message. From then on, the REJ message would travel back to the leader the same way an ACK message would have travelled had the alternate path been set up successfully. A REJ message causes the spare channels receiving and forwarding the REJ message at a node to be released and marked free.

For the sake of clarity, the illustrative network of FIG. 2 has only one working channel and one spare channel per link. However, the inventive process described above is equally applicable for a network with communications links each having a plurality of working channels and/or spare channels. Further, although FIG. 2 shows only two pairs of custodial nodes which are different, in actuality, such pairs of custodial nodes may be the same, i.e. having the same leader node and the same follower node but routed on different alternate paths, since multiple links connecting the same adjacent nodes may become faulty at the same time due to the same fiber cut; or there may be multiple pairs of custodial nodes where all such pairs are not exactly the same.

Once the leaders and the followers are properly designated for each communications circuit or path in the network, and the spare channel manifests are set up accordingly, the present invention can set up alternate paths and assign spare channels to such alternate paths for restoring multiple simultaneously disrupted circuits.

While the present invention has been described in terms of a preferred embodiment, do note that the present invention is subject to many variations, modifications and changes in detail. Accordingly, it should be appreciated that this specification and the accompanying drawings be interpreted as illustrative only and not to be limiting. Accordingly, it is intended that this invention be limited only by the spirit and scope of the herein appended claims.

We claim:

1. In a telecommunications network having a plurality of nodes interconnected by a plurality of working channels and spare channels, a method of restoring traffic disrupted by at least one malfunctioned working channel, comprising the steps of:

(a) provisioning a manifest in each of the nodes of said network, each manifest having at least one identifier representative of a location in the network bracketed by two adjacent nodes to which a fault may occur and a spare channel associated with said at least one identifier to be used to establish an alternate path in response to said fault for rerouting the disrupted traffic;

(b) designating the pair of nodes bracketing said at least one malfunctioned working channel a leader node and a follower node;

(c) effecting said leader node to access its manifest to select a leader/follower node identifier representative of said leader and follower nodes and to send a restoration message containing respective identifiers of said leader and follower nodes and a malfunctioned working channel identifier of said at least one malfunctioned working channel onto an available spare channel associated with said leader/follower node identifier;

(d) effecting each of said nodes other than said leader node, in receipt of said restoration message, to extract said follower node identifier from said restoration message and to reserve the spare channel from which said restoration message was received for said alternate path if its node identifier is not the same as the follower node identifier extracted from said restoration message;

(e) propagating said restoration message to its neighbor nodes via available spare channels connected thereto;

(f) effecting said each node to send an acknowledge message onto the same spare channel from which said restoration message was received if its node identifier is the same as said follower node identifier;

(g) propagating said acknowledge message to said leader node;

(h) effecting said leader node, upon receipt of said acknowledge message from the spare channel to which it had sent its restoration message, to decide that an alternate path has been established; and (i) rerouting said disrupted traffic onto said established alternate path.

2. Method of claim 1, further comprising the steps of:

provisioning in said each node of the network an assignment record for each spare channel connected to said each node, said assignment record of said each spare channel indicating the availability of said each spare channel; and effecting said leader node to select any spare channel associated with said leader/follower node identifier and to access its assignment record to determine if said available spare channel is usable.

3. Method of claim 1, further comprising the steps of:

provisioning in said each node of the network an assignment record for each spare channel connected to said each node, said assignment record of said each spare channel indicating the availability of said each spare channel;

effecting said follower node to note the spare channel from which said restoration message was received and to check its assignment record relating to said noted spare channel to determine the status of said noted spare channel.

4. Method of claim 1, further comprising the steps of:

provisioning in said each node of the network an assignment record for each spare channel connected to said each node, said assignment record of said each spare channel indicating the availability of said each spare channel; and effecting said each node other than said follower node to update the status of any reserved spare channel in its assignment record so that said any reserved spare channel becomes unavailable to other nodes of said network.

5. In a telecommunications network having a plurality of nodes having respective node identifiers interconnected by a plurality of working channels and spare channels, a system for establishing at least one alternate route for rerouting traffic disrupted by at least one malfunctioned working channel bracketed by a leader node and a follower node, comprising:

a manifest being provided in each of the nodes of said network, each manifest having at least one identifier representative of a location in the network bracketed by two adjacent nodes to which a fault may occur and at least one spare channel associated with said at least one identifier to be used to establish an alternate path in response to said fault for rerouting the disrupted traffic;

means at said leader node for accessing the manifest of said leader node to select a path identifier representative of the path between said leader and follower nodes and sending a restoration message including said path identifier onto any available spare channel associated with said path identifier, said path identifier including respective identifiers for said leader node and said follower node and a malfunctioned working channel identifier for identifying said one malfunctioned working channel; and decision means at each of said nodes other than said leader node, in receipt of said restoration message, for extracting at least said follower node identifier from said restoration message, said each node decision means either reserving the spare channel from which said restoration message was received for said alternate path if the node identifier of said each node is not the same as the follower node identifier extracted from said restoration message or forwarding an acknowledge message onto said spare channel from which said restoration message was received if said each node identifier is the same as said follower node identifier, said acknowledge message being propagated to said leader node;

said decision means at said leader node, upon receipt of said acknowledge message from the spare channel to which it had sent its restoration message, deciding that an alternate path has been established for rerouting said disrupted traffic.

6. System of claim 5, further comprising:

an assignment record of each spare channel connected to each of said nodes being provided in said each node, said assignment record of said each spare channel indicating the availability of said each spare channel;

said switch means at said leader node selecting any spare channel associated with said path identifier and accessing the assignment record of said leader node to determine if said selected any spare channel is available for use.

7. System of claim 5, further comprising:

an assignment record of each spare channel connected to each of said nodes being provided in said each node, said assignment record of said each spare channel indicating the availability of said each spare channel; and means at said follower node for noting the spare channel from which said restoration message was received and checking the assignment record relating to said noted spare channel in said follower node to determine the availability status of said noted spare channel.

8. System of claim 5, further comprising:

an assignment record of each spare channel connected to each of said nodes being provided in said each node, said assignment record of said each spare channel indicating the availability of said each spare channel;

said switch means at said each node other than said follower node for updating the status of any reserved spare channel in the assignment record of said each node so that said any reserved spare channel becomes unavailable to other nodes of said network.

9. In a telecommunications network having a plurality of nodes interconnected by a plurality of working channels and spare channels, a method of restoring respective traffic flows disrupted by at least two malfunctioned working channels each occurred between a different pair of adjacent nodes, comprising the steps of:

(a) provisioning a manifest in each of the nodes of said network, each manifest having a plurality of identifiers each representative of a location in the network bracketed by two adjacent nodes to which a fault may occur and at least one spare channel associated with said each identifier to be used to establish an alternate path in response to said fault for rerouting the disrupted traffic;

(b) provisioning in said each node a plurality of assignment records each representing the availability of a spare channel connected to said each node;

(c) each said pair of adjacent nodes designating one of said adjacent nodes a leader node and the other of said adjacent nodes a follower node;

effecting said leader node to access its manifest to select a node pair identifier representative of said each said pair of adjacent nodes and send a restoration message onto said one spare channel associated with said node pair identifier; and (d) each of said nodes other than said leader node, in receipt of said restoration message from said leader node of said each said pair of adjacent nodes, extracting from said restoration message respective identifiers of said leader node and follower node, comparing its own node identifier against the follower node identifier extracted from said restoration message, deciding it is not a follower node if its node identifier is not the same as said follower node identifier extracted from said restoration message, and propagating said restoration message to its neighbor nodes via available spare channels connected thereto, deciding it is said follower node if its node identifier is the same as said follower node identifier extracted from said restoration message, and forwarding an acknowledge message to said leader node on the same spare channel from which said restoration message was received;

said leader node for said each said pair of adjacent nodes, upon receipt of said acknowledge message from the spare channel to which it had sent its restoration message, deciding that an alternate path has been set up for rerouting the disrupted traffic for the one of said at least two malfunctioned working channels bracketed by said each said pair of adjacent nodes.

10. Method of claim 9, wherein said leader node of said each said pair of adjacent nodes further accesses its assignment record to determine if the selected spare channels are available for use and sends a restoration message containing said leader and follower identifier of said each said pair of adjacent nodes onto any available selected spare channel.

11. Method of claim 9, wherein said each node other than said leader node further notes the spare channel from which said restoration message was received;

checks its assignment record relating to said noted spare channel to determine the status of said noted spare channel;

reserves said noted spare channel for said leader and follower identifier of said each said pair of adjacent nodes if said noted spare channel is available; and updates the status of said noted spare channel in its assignment record.

12. Method of claim 9, wherein said each node other than said leader node, upon deciding that it is not said follower node for said each said pair of adjacent nodes, further accesses its manifest for the identifier representative of said each said pair of adjacent nodes to locate any spare channels associated with said identifier to which said each node is connected;

determines if said any associated spare channel is available;

selects said any associated spare channel if it is available and routes said restoration message onto said selected any associated spare channel;

updates its assignment record to indicate said any associated spare channel is reserved for use as an alternate route by said each said pair of adjacent nodes; and enters into a wait state to await said acknowledge message in response to said restoration message.

13. Method of claim 9, wherein said each node other than said leader node, upon deciding that it is not said follower node for said each said pair of adjacent nodes, further accesses its manifest for the identifier representative of said each said pair of adjacent nodes to locate any spare channels associated with said identifier;

determines if said any associated spare channel is available; and sends a reject message onto said spare channel from which said each node received said restoration message if no spare channel is available.

14. In a telecommunications network having a plurality of nodes interconnected by a plurality of working channels and spare channels, a system for restoring respective traffic flows disrupted by at least two malfunctioned working channels each occurred between different pairs of adjacent nodes each having a leader node and a follower node, comprising:

a manifest provided in each of the nodes of said network, each manifest having a plurality of identifiers each representative of a location in the network bracketed by two adjacent nodes to which a fault may occur and at least one spare channel associated with each of said identifiers to be used to establish an alternate path in response to said fault for rerouting the disrupted traffic;

a plurality of assignment records each representing the availability of a spare channel connected to said each node provided in said each node;

means in each leader node of each pair of said different pairs of adjacent nodes for accessing the manifest of said each leader node to select a node pair identifier representative of said each pair of adjacent nodes and send a restoration message onto said one spare channel associated with said selected node pair identifier;

means in each of said nodes other than said leader nodes, in receipt of said restoration message from said each leader node, for extracting from said restoration message identifiers including respective identifiers of said each leader node and its corresponding follower node, comparing its own node identifier against the follower node identifier extracted from said restoration message, deciding it is not said follower node of said pair of adjacent nodes if its node identifier is not the same as said follower node identifier, and propagating said restoration message to its neighbor nodes via available spare channels connected thereto, deciding it is said follower node if its node identifier is the same as said follower node identifier, and forwarding an acknowledge message to said each leader node on the same spare channel from which said restoration message was received; and means at said leader node for said each pair of said different pairs of adjacent nodes, upon receipt of said acknowledge message from the spare channel to which it had sent its restoration message, for deciding that an alternate path has been set up for rerouting the disrupted traffic for the one malfunctioned working channel bracketed by said each pair of said different pairs of adjacent nodes.

15. System of claim 14, wherein said leader node of said each pair of said different pairs of adjacent nodes further accesses its assignment record to determine if any selected spare channel is available for use and sends a restoration message containing said selected identifier of said each pair of said different pairs of adjacent nodes onto any available selected spare channel.

16. System of claim 14, wherein said each node other than said leader nodes further notes the spare channel from which said restoration message was received;

checks its assignment record relating to said noted spare channel to determine the status of said noted spare channel;

reserves said noted spare channel for said leader and follower identifier of said each pair of said different pairs of adjacent nodes if said noted spare channel is available; and updates the status of said noted spare channel in its assignment record.

17. System of claim 14, wherein said each node other than said leader nodes, upon deciding that it is not any of said follower nodes for said different pairs of adjacent nodes, further accesses its manifest for the identifier representative of said each pair said different pairs of adjacent nodes to locate any spare channels associated with said identifier to which said each node is connected;

determines if said any associated spare channel is available;

selects said any associated spare channel if it is available and routes said restoration message onto said selected any associated spare channel;

updates its assignment record to indicate said any associated spare channel is reserved for use as an alternate route by said each pair of said different pairs of adjacent nodes; and enters into a wait state to await said acknowledge message in response to said restoration message.

18. System of claim 14, wherein said each node other than said leader nodes, upon deciding that it is not said follower node for said each pair of said different pairs of adjacent nodes, further accesses its manifest for the identifier representative of said each pair of said different pairs of adjacent nodes to locate any spare channels associated with said identifier;

determines if said any associated spare channel is available; and sends a reject message onto said spare channel from which said each node received said restoration message if no spare channel is available.

19. In a telecommunications network having a plurality of nodes interconnected by a plurality of working channels and spare channels, a method of simultaneously restoring traffic disrupted by at least two malfunctioned working channels bracketed by at least one and another pair of custodial nodes, comprising the steps of:

(a) provisioning a manifest in each of said plurality of nodes of said network, each manifest having at least one identifier representative of two adjacent nodes and at least one spare channel associated with said at least one identifier to be used to establish an alternate path;

(b) designating said one pair of custodial nodes bracketing a first malfunctioned working channel a one leader node and a one follower node;

(c) designating said another pair of custodial nodes bracketing a second malfunctioned working channel an other leader node and an other follower node;

(d) effecting said one and other leader nodes to access their respective manifests to select one and another identifiers representative of said one and another pairs of custodial nodes, respectively, each of said one and another identifiers including respective identifications (IDs) for said corresponding leader and follower nodes;

(e) effecting said one and other leader nodes to send one and another restoration messages onto any available selected spare channels respectively associated with said one and another identifiers;

(f) designating as helper nodes said plurality of nodes which are not said leader and follower nodes;

(g) effecting each of said helper nodes, in receipt of either of said one and another restoration messages, to extract said one or another identifier from said either restoration message and to reserve the spare channel from which said either restoration message was received to set up the alternate path related to said either restoration message;

(h) effecting said one and other follower nodes, upon receipt of said one and another restoration messages, respectively, to send respective one and another acknowledge messages onto the spare channel from which said one or another restoration message was received;

(i) propagating said one and another acknowledge messages via said helper nodes, if any, to said one and other leader nodes, respectively;

(j) effecting said one and other leader nodes, upon receipt of said one and another acknowledge messages, respectively, to determine that corresponding alternate paths have been established for said one and another pairs of custodial nodes; and (k) rerouting the traffic respectively disrupted by said first and second malfunctioned working channels onto said alternate paths correspondingly established for said one and another pairs of custodial nodes.

20. Method of claim 19, further comprising the step of:

provisioning in said each node of the network an assignment record for each spare channel connected to said each node, said assignment record of said each spare channel indicating the availability of said each spare channel.

21. Method of claim 20, further comprising the step of:

effecting said one and other leader nodes to select any spare channel associated with said one and another identifiers, respectively; and effecting each of said one and other leader nodes to access its assignment record to determine if said any selected spare channel is available for use.

22. Method of claim 20, further comprising the steps of:

effecting each of said one and other follower nodes to note the spare channel from which said one and another restoration messages, respectively, was received; and effecting each of said one and other follower nodes to check its assignment record relating to said noted spare channel to determine the status of said noted spare channel.

23. Method of claim 20, further comprising the steps of:

effecting said each helper node to update the status of any reserved spare channel in its assignment record so that said any reserved spare channel becomes unavailable to other nodes of said network.

24. Method of claim 19, wherein said one and another pairs of custodial nodes are the same.

25. In a telecommunications network having a plurality of nodes interconnected by a plurality of working channels and spare channels, a system for simultaneously restoring traffic disrupted by at least a first malfunctioned working channel bracketed by at least one pair of custodial nodes each having a one leader node and a one follower node and a second malfunctioned working channel bracketed by at least another pair of custodial nodes having an other leader node and an other follower node, said plurality of nodes that are not leader or follower nodes being helper nodes, said system comprising:

a manifest provided in each of said plurality of nodes of said network, each manifest having multiple identifiers each representative of two adjacent nodes and at least one spare channel associated with each of said identifiers to be used to establish an alternate path;

means in each of said one and other leader nodes for accessing their respective manifests to select one and another identifiers representative of said one and another pairs of custodial nodes, respectively, each of said one and another identifiers including respective identifications (IDs) for said corresponding leader and follower nodes;

means in said one and other leader nodes each for sending one and another restoration messages, respectively, onto any available selected spare channels respectively associated with said one and another identifiers;

means in each of said helper nodes, in receipt of either of said one and another restoration messages, for extracting said one or another identifier from said either restoration message and to reserve the spare channel from which said either restoration message was received to set up the alternate path related to said either restoration message; and means in said one and other follower nodes, upon receipt of said one and another restoration messages, respectively, for sending respective one and another acknowledge messages onto the spare channel from which said one or another restoration message was received, said one and another acknowledge messages being propagated via said helper nodes, if any, to said one and other leader nodes, respectively;

said means in said one and other leader nodes, upon receipt of said one and another acknowledge messages, respectively, determining that corresponding alternate paths have been established for said one and another pairs of custodial nodes so that the traffic respectively disrupted by said first and second malfunctioned working channels are rerouted onto said alternate paths correspondingly established for said one and another pairs of custodial nodes.

26. System of claim 25, further comprising:

an assignment record provided in said each node of the network for each spare channel connected to said each node, said assignment record of said each spare channel indicating the availability of said each spare channel.

27. System of claim 26, wherein said one and other leader nodes further selects any spare channel associated with said one and another identifiers, respectively, and accesses its assignment record to determine if said any selected spare channel is available for use.

28. System of claim 26, wherein each of said one and other follower nodes further notes the spare channel from which said one and another restoration messages, respectively, was received and checks its assignment record relating to said noted spare channel to determine the status of said noted spare channel.

29. System of claim 26, wherein said each helper node further updates the status of any reserved spare channel in its assignment record so that said any reserved spare channel becomes unavailable to other nodes of said network.

30. System of claim 25, wherein said one and another pairs of custodial nodes are the same.

* * * * *